(12) United States Patent
Tojima et al.

(10) Patent No.: US 10,014,738 B2
(45) Date of Patent: Jul. 3, 2018

(54) MAGNETIC WAVE GEAR DEVICE

(71) Applicants: IHI Corporation, Tokyo (JP); Osaka University, Osaka (JP)

(72) Inventors: Narifumi Tojima, Tokyo (JP); Koshi Ishimoto, Tokyo (JP); Katsuhiro Hirata, Osaka (JP); Noboru Niguchi, Osaka (JP); Ariff Zaini, Osaka (JP); Tsubasa Oshiumi, Osaka (JP); Eiki Morimoto, Osaka (JP)

(73) Assignees: IHI CORPORATION, Tokyo (JP); OSAKA UNIVERSITY, Osaka (JP)

( * ) Notice: Subject to any disclaimer, the term of this patent is extended or adjusted under 35 U.S.C. 154(b) by 325 days.

(21) Appl. No.: 14/768,681

(22) PCT Filed: May 21, 2013

(86) PCT No.: PCT/JP2013/064083
§ 371 (c)(1),
(2) Date: Aug. 18, 2015

(87) PCT Pub. No.: WO2014/128985
PCT Pub. Date: Aug. 28, 2014

(65) Prior Publication Data
US 2016/0006304 A1    Jan. 7, 2016

(30) Foreign Application Priority Data

Feb. 22, 2013 (JP) ................. 2013-033695

(51) Int. Cl.
*H02K 16/02* (2006.01)
*H02K 21/14* (2006.01)
(Continued)

(52) U.S. Cl.
CPC ............. *H02K 1/2793* (2013.01); *H02K 1/16* (2013.01); *H02K 1/17* (2013.01); *H02K 1/2706* (2013.01);
(Continued)

(58) Field of Classification Search
CPC ........ H02K 16/02; H02K 21/14; H02K 21/12; H02K 49/102; H02K 49/10; H02K 23/04; H02K 21/24; F16H 49/005; F16H 13/12
(Continued)

(56) References Cited

U.S. PATENT DOCUMENTS 3,984,711 A * 10/1976 Kordik .................. H02K 37/20
310/154.07
4,011,479 A * 3/1977 Volkrodt .................. H02K 3/20
310/181
(Continued)

FOREIGN PATENT DOCUMENTS

EP    3147542 A1 * 3/2017 ............. F16H 49/00
JP    2000-60091 A    2/2000
(Continued)

OTHER PUBLICATIONS

International Search Report dated Aug. 27, 2013 in PCT/JP2013/064083.

*Primary Examiner* — Edgardo San Martin
(74) *Attorney, Agent, or Firm* — Rothwell, Figg, Ernst & Manbeck, P.C.

(57) ABSTRACT

A magnetic wave gear device (1A, 1B, 1F) includes: a first member (10), a second member (20), and a third member (30) which are rotatable relative to one another around a rotation axis (R). The second member (20) is disposed between the first member (10) and the third member (30), and includes magnetic material pieces (21). The first member (10) includes first permanent magnets (12A, 12B). The
(Continued)

third member (30) includes: a plurality of pole teeth (32), a pole tooth (32) being wound with a coil (33); and second permanent magnets (34B), each second permanent magnet (34B) being disposed between pole teeth (32) next to each other, and the magnetic poles of sides of the second permnanent magnets (34B) facing the second member (20) being the same pole.

7 Claims, 5 Drawing Sheets

(51) Int. Cl.
*H02K 1/27* (2006.01)
*H02K 1/16* (2006.01)
*H02K 1/17* (2006.01)
*H02K 49/06* (2006.01)
*H02K 49/10* (2006.01)
*H02K 16/00* (2006.01)
*H02K 21/12* (2006.01)

(52) U.S. Cl.
CPC ........... *H02K 1/2786* (2013.01); *H02K 49/06* (2013.01); *H02K 49/102* (2013.01)

(58) Field of Classification Search
USPC ............ 310/154.02, 154.11, 154.08, 154.17, 310/154.29
See application file for complete search history.

(56) References Cited

U.S. PATENT DOCUMENTS

| | | | | |
|---|---|---|---|---|
| 4,217,513 A * | 8/1980 | Kohzai | ................ | H02K 23/02 310/154.43 |
| 4,532,447 A * | 7/1985 | Cibie | ................ | H02K 51/00 310/114 |
| 4,758,756 A * | 7/1988 | Pouillange | ............ | H02K 19/18 310/12.27 |
| 5,633,555 A * | 5/1997 | Ackermann | .......... | F04D 13/027 310/103 |
| 6,049,152 A * | 4/2000 | Nakano | ................ | H02K 11/048 310/114 |
| 6,133,664 A * | 10/2000 | Torok | ................ | H02K 29/03 310/181 |
| 6,242,834 B1 * | 6/2001 | Akemakou | ............ | H02K 19/24 310/162 |
| 6,262,508 B1 | 7/2001 | Shibayama et al. | | |
| 6,563,244 B1 * | 5/2003 | Yamauchi | ............ | F16C 32/0459 310/154.02 |
| 6,700,272 B1 * | 3/2004 | Lindner | ................ | H02K 1/12 310/166 |
| 6,724,114 B2 | 4/2004 | Horst | | |
| 6,777,842 B2 * | 8/2004 | Horst | ................ | H02K 21/04 310/154.11 |
| 7,511,395 B2 * | 3/2009 | Han | ................ | H02K 16/02 310/114 |
| 7,868,506 B2 * | 1/2011 | Hoang | ................ | C23C 4/04 310/154.11 |
| 7,898,135 B2 * | 3/2011 | Flynn | ................ | H02K 19/103 310/152 |
| 7,977,841 B2 * | 7/2011 | Yang | ................ | H02K 1/02 310/181 |
| 8,633,628 B2 * | 1/2014 | Jung | ................ | H02K 21/44 310/181 |
| 9,444,319 B2 * | 9/2016 | Tonari | ................ | H02K 51/00 |
| 9,692,267 B2 * | 6/2017 | Tojima | ................ | H02K 16/04 |
| 2004/0108781 A1 * | 6/2004 | Razzell | ................ | H02K 7/11 310/112 |
| 2013/0057100 A1 * | 3/2013 | Fukushima | ............ | H02K 51/00 310/114 |
| 2017/0093257 A1 * | 3/2017 | Hirata | ................ | H02K 19/103 |

FOREIGN PATENT DOCUMENTS

| | | | | |
|---|---|---|---|---|
| JP | 2009-535012 A | 9/2009 | | |
| JP | 2010-106940 A | 5/2010 | | |
| JP | 2010-223340 A | 10/2010 | | |
| JP | 2014163431 A * | 9/2014 | ............. | H02K 1/16 |
| JP | 2016135014 A * | 7/2016 | | |
| WO | 2007/125284 A1 | 11/2007 | | |

* cited by examiner

MAGNETIC WAVE GEAR DEVICE

CROSS REFERENCE TO RELATED APPLICATION

This application is a 35 U.S.C. 371 National Phase Entry Application from PCT/JP2013/064083, filed May 21, 2013, which claims priority to Japanese Patent Application No. 2013-033695, filed Feb. 22, 2013, the disclosures of which are incorporated herein in their entirety by reference.

TECHNICAL FIELD

The present invention relates to a magnetic wave gear device.

Priority is claimed on Japanese Patent Application No. 2013-033695, filed Feb. 22, 2013, the content of which is incorporated herein by reference.

BACKGROUND

Patent Document 1 discloses a magnetic wave gear device in which a high-speed rotor, a low-speed rotor, and a stator are rotatable relative to one another around a rotation axis. In a case where the magnetic wave gear device is used as, for example, an electric motor, the stator is provided with coils. Harmonic magnetic flux is generated by rotating the high-speed rotor by magnetomotive force of the coils, and the low-speed rotor serving as an output shaft rotates at a predetermined speed reduction ratio (speed reduction ratio of the low-speed rotor to the high-speed rotor) by using the harmonic magnetic flux. In this case, the magnetic wave gear device has two functions of a magnetic speed reducer and of a brushless motor.

In principle, the magnetic wave gear device can obtain a predetermined speed reduction ratio (or a speed increasing ratio) in a state where a rotor and a stator do not contact each other, and therefore has characteristics of low friction, low noise, and excellent durability compared to a mechanical speed reducer (or a mechanical speed increaser). In addition, as described above, since the magnetic wave gear device has functions of a speed reducer and of an electric power generator (electric motor) if the stator is provided with coils, it is possible to adopt a configuration of what is called direct drive in which a speed reduction mechanism is omitted and an electric power generator and a rotary shaft are directly connected to each other. Accordingly, the magnetic wave gear device has been tried to be used as, for example, a direct drive-type power generator main body of a wind power generator in which the power generator main body is disposed at a height of several tens of meters from the ground and a lot of effort is required for maintenance of a speed increaser (refer to Patent Document 2).

The magnetic wave gear device includes a type (hereinafter, may be referred to as a "double-sided magnet type") which has been researched and developed by the United Kingdom University of Sheffield and another type (hereinafter, may be referred to as a "single-sided magnet type") which has been researched and developed by Osaka University (to which part of the inventors of this application belongs) (refer to FIGS. 10 and 11 of Patent Document 2). Briefly describing the difference in configuration of the two types, the double-sided magnet type is a type including permanent magnets provided in the high-speed rotor and in the stator, and the single-sided magnet type is a type including permanent magnets provided only in the high-speed rotor.

DOCUMENT OF RELATED ART

Patent Document

[Patent Document 1] Japanese Unexamined Patent Application, First Publication No. 2010-106940
[Patent Document 2] Japanese Unexamined Patent Application, First Publication No. 2010-223340

SUMMARY

Technical Problem

The two sides-magnet type has an advantage that the maximum transmission torque (the maximum torque capable of being transmitted) is high because the amount of disposed permanent magnets is large. However, a permanent magnet provided in the stator becomes a gap (a separation between the rotor and the stator), the distance between the rotor and the stator (a pole tooth) is increased, and therefore the power generation (or energizing) torque (torque required for driving an electric power generator, or torque which an electric motor generates at the time electric power is applied to the motor) may be decreased. Furthermore, the productivity may deteriorate because a large amount of costly neodymium magnets or the like is used.

The single-sided magnet type has excellent productivity because the amount of disposed permanent magnets is small. In addition, since no permanent magnet is provided in the stator, a gap caused by the permanent magnet is not formed, and the power generation (or energizing) torque is high. However, the maximum transmission torque may be decreased because the amount of magnetic flux passing through a magnetic circuit is small.

Therefore, even if a magnetic wave gear device in the related art is used for the direct drive, this device is inferior in performance compared to a general permanent magnet-type power generator (electric motor), and development of a new type for practical use has been sought.

The present invention is made in view of the above problems, and an object of the present invention is to provide a magnetic wave gear device which can balance the productivity and the performance with each other and which is excellent particularly in application to the direct drive.

Solution to Problem

The inventors of this application have diligently conducted experiments in order to solve the above problems, and as a result, have discovered that the productivity and the performance can be balanced by disposing an appropriate number of permanent magnets in appropriate locations as described below without using a large amount of permanent magnets unlike the double-sided magnet type, thereby having completed the present invention. That is, in order to solve the above problems, the following configurations are adopted.

A magnetic wave gear device of the present invention includes: a first member, a second member, and a third member which are rotatable relative to one another around a rotation axis. The second member is disposed between the first and third members, and includes a plurality of magnetic material pieces disposed around the rotation axis. The first member includes a plurality of first permanent magnets facing the second member and disposed around the rotation axis. The third member includes: a plurality of pole teeth facing the second member and disposed around the rotation axis, a pole tooth being wound with a coil; and a plurality of second permanent magnets, each second permanent magnet being disposed between pole teeth next to each other, and the magnetic poles of sides of the second permanent magnets facing the second member being the same pole. In addition, the plurality of magnetic material pieces, the plurality of first permanent magnets, the plurality of pole teeth, or the plurality of second permanent magnets may be disposed at regular intervals around the rotation axis.

In this case, the plurality of first permanent magnets may be disposed such that the magnetic poles of first permanent magnets next to each other are opposite to each other in a radial direction.

The plurality of first permanent magnets may be disposed such that the magnetic poles of sides of the first permanent magnets facing the second member are the same pole. In this case, a second magnetic material piece may be disposed between first permanent magnets next to each other.

The second permanent magnet may be disposed between the coil and the second member in the radial direction.

The third member may further include a pole tooth intermediate portion disposed between coils wound on pole teeth next to each other, and the second permanent magnet may be disposed between the pole tooth intermediate portion and the second member in the radial direction.

The second permanent magnet may be provided so as to contact the pole tooth.

A gap may be formed between the second permanent magnet and the pole tooth.

Effects

According to the present invention, a magnetic wave gear device is obtained which can balance the productivity and the performance with each other and which is excellent particularly in application to the direct drive.

DESCRIPTION OF EMBODIMENTS

Hereinafter, embodiments of the present invention are described with reference to the drawings. In the following description, a case where a magnetic wave gear device of the present invention is applied to a motor (electric motor) is shown.

Figure 1:
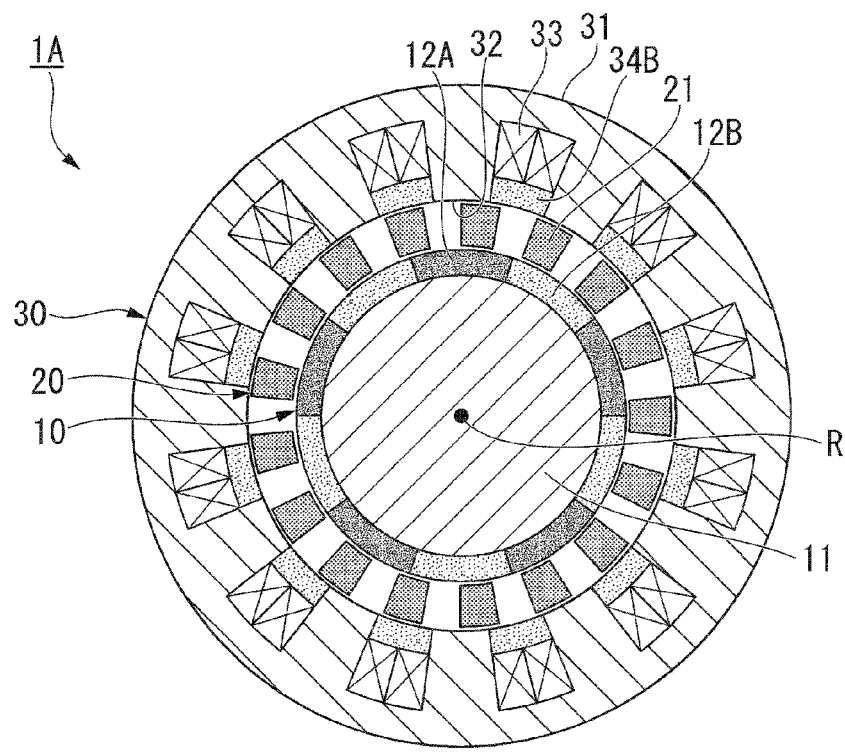
FIG. 1 is a cross-sectional configuration diagram showing a magnetic wave gear device of a first embodiment of the present invention.

FIG. 1 is a cross-sectional configuration diagram showing a magnetic wave gear device 1A of a first embodiment of the present invention.

As shown in FIG. 1, the magnetic wave gear device 1A is configured so that a high-speed rotor (first member) 10, a low-speed rotor (second member) 20, and a stator (third member) 30 are rotatable relative to one another around a rotation axis R. In the magnetic wave gear device 1A, the high-speed rotor 10, the low-speed rotor 20, and the stator 30 are disposed in this order from inside in a radial direction (a direction orthogonal to the rotation axis R).

The high-speed rotor 10 includes a core 11 formed of a magnetic material, and a plurality of permanent magnets (first permanent magnets) 12A and 12B. The core 11 is formed in a columnar shape. The core 11 is disposed coaxially with the rotation axis R. The permanent magnets 12A and 12B are provided on the outer periphery of the core 11. The plurality of permanent magnets 12A and 12B face the low-speed rotor 20 and are alternately disposed at regular intervals around the rotation axis R. The permanent magnets 12A and 12B are disposed such that the magnetic poles of sides of the permanent magnets 12A and 12B facing the low-speed rotor 20 are different from each other. In more detail, in this embodiment, the magnetic poles of sides of the plurality of permanent magnets 12A facing the low-speed rotor 20 are the same pole as the north pole, and the magnetic poles of sides of the plurality of permanent magnets 12B facing the low-speed rotor 20 are the same pole as the south pole. That is, the magnetic poles of permanent magnets 12A and 12B next to each other are opposite to each other in the radial direction.

The low-speed rotor 20 has an approximately cylindrical shape and is disposed between the high-speed rotor 10 and the stator 30 in the radial direction. The low-speed rotor 20 includes a plurality of magnetic material pieces 21 formed of a magnetic material. The plurality of magnetic material pieces 21 are disposed at regular intervals around the rotation axis R. In addition, although only the magnetic material pieces 21 are shown in FIG. 1, the magnetic material pieces 21 are united with each other through a resin plate or the like (not shown). Therefore, the positional relationship such as the intervals of the plurality of magnetic material pieces 21 is properly held.

The stator 30 is disposed outside of the low-speed rotor 20. The stator 30 includes a yoke 31, a plurality of pole teeth 32, a plurality of coils 33, and a plurality of permanent magnets (second permanent magnets) 34B. The yoke 31 is formed of a magnetic material into an approximately cylindrical shape. The pole teeth 32 are formed integrally with the yoke 31, and project inward in the radial direction from the yoke 31. That is, the pole teeth 32 are formed of a magnetic material and are disposed so as to face the low-speed rotor 20. The plurality of pole teeth 32 are disposed at regular intervals around the rotation axis R. A coil 33 is wound on each pole tooth 32. A plurality of coils 33 are divided into, for example, a U-phase, a V-phase, and a W-phase. A slot, which opens toward the low-speed rotor 20, is formed between pole teeth 32 next to each other, and the coils 33 are disposed inside the slot.

Each permanent magnet 34B is disposed between pole teeth 32 next to each other. That is, the permanent magnets 34B are not positioned on the tops of the pole teeth 32, but are positioned at the openings of the slots inside which the coils 33 wound on the pole teeth 32 are disposed, and face an air-gap with respect to the low-speed rotor 20 (a gap between the low-speed rotor 20 and the stator 30). The permanent magnets 34B are disposed between the coils 33 and the low-speed rotor 20 in the radial direction. The surface of the permanent magnet 34B close to the low-speed rotor 20 is disposed at approximately the same position as the top surface of the pole tooth 32 in the radial direction. Although the permanent magnet 34B in this embodiment contacts the pole tooth 32, a gap may be formed between the permanent magnet 34B and the pole tooth 32 (refer to FIG. 8 described later). The magnetic poles of sides of the plurality of permanent magnets 34B facing the low-speed rotor 20 are the same pole, and in this embodiment, are set to be the south pole. In addition, the magnetic poles of sides of the permanent magnets 34B facing the low-speed rotor 20 may be the north pole as long as the magnetic poles are the same in a direction toward the air-gap with respect to the low-speed rotor 20.

When a pole pair number (the number of pairs of magnetic poles, namely the number of pairs of permanent magnets 12A and 12B) of the high-speed rotor 10, a magnetic pole number (the number of the magnetic material pieces 21) of the low-speed rotor 20, and a pole pair number (the number of pairs of magnetic poles, namely the number of sets of the pole tooth 32 and the permanent magnet 34B) of the stator 30 are denoted by $N_h$, $N_l$, and $N_s$, respectively, the magnetic wave gear device 1A having the above configuration is configured so that the following equation (1) is satisfied.

$$N_s = N_l \pm N_h \tag{1}$$

Since the technical significance of satisfying the equation (1) is described in detail in Patent Document 1 (Japanese Unexamined Patent Application, First Publication No. 2010-106940), the description of the technical significance is omitted.

In this embodiment, the pole pair number $N_h$ of the high-speed rotor 10 is 5, the magnetic pole number $N_l$ of the low-speed rotor 20 is 17, and the pole pair number $N_s$ of the stator 30 is 12. Therefore, the equation (1) is satisfied.

When the equation (1) is satisfied, a speed reduction ratio Gr shown by the following equation (2) is obtained. The speed reduction ratio Gr is a speed reduction ratio of the low-speed rotor 20 to the high-speed rotor 10.

$$Gr = N_l / N_h \tag{2}$$

In this magnetic wave gear device 1A, harmonic magnetic flux is generated by rotating the high-speed rotor 10 by magnetomotive force of the coils 33 provided in the stator 30, and the low-speed rotor 20 serving as an output shaft rotates in accordance with the speed reduction ratio Gr by using the harmonic magnetic flux.

Consequently, in the first embodiment, the following configuration is adopted. The magnetic wave gear device 1A includes: the high-speed rotor 10, the low-speed rotor 20, and the stator 30 which are rotatable relative to one another around the rotation axis R. The low-speed rotor 20 is disposed between the high-speed rotor 10 and the stator 30, and includes the plurality of magnetic material pieces 21 disposed around the rotation axis R. The high-speed rotor 10 includes the plurality of permanent magnets 12A and 12B facing the low-speed rotor 20 and disposed around the rotation axis R. The stator 30 includes: the plurality of pole teeth 32 facing the low-speed rotor 20 and disposed around the rotation axis R, the pole tooth 32 being wound with the coil 33; and the plurality of permanent magnets 34B, each permanent magnet 34B being disposed between pole teeth 32 next to each other, and the magnetic poles of sides of the permanent magnets 34B facing the low-speed rotor 20 being the same pole. According to this configuration, the amount of disposed permanent magnets can be decreased into about ¾ of that of the double-sided magnet type shown in FIG. 3A described later. Hereinafter, the magnetic wave gear device 1A may be referred to as a "¾-PM type".

Next, a second embodiment of the present invention is described. In the following description, a component, which is the same as or is similar to the first embodiment, is represented by the same reference sign as the first embodiment, and the description of the component is simplified or is omitted.

Figure 2:
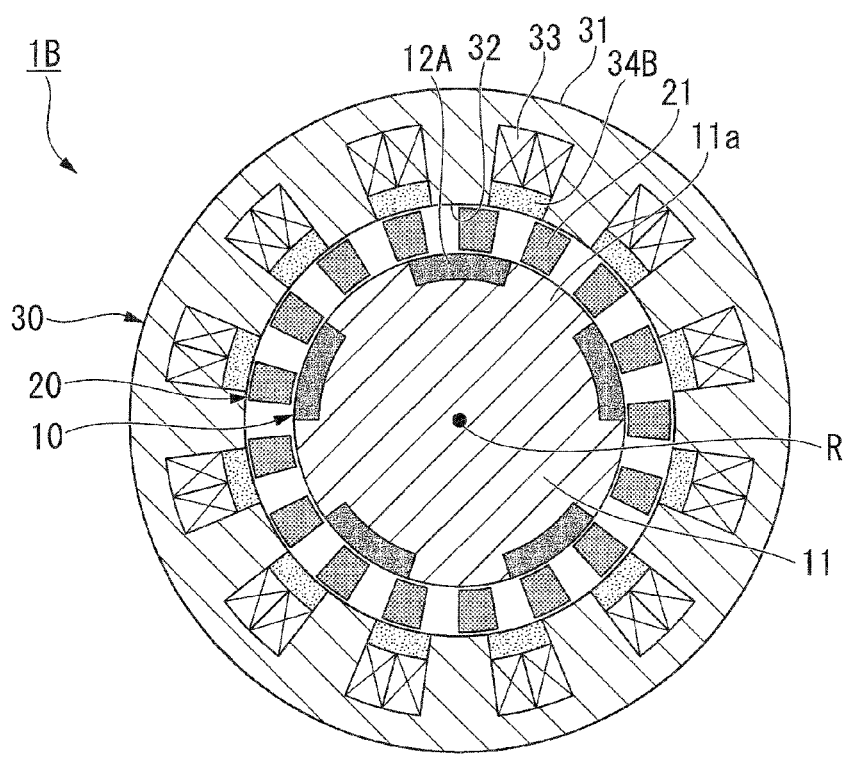
FIG. 2 is a cross-sectional configuration diagram showing a magnetic wave gear device of a second embodiment of the present invention.

FIG. 2 is a cross-sectional configuration diagram showing a magnetic wave gear device 1B of the second embodiment of the present invention.

As shown in FIG. 2, the magnetic wave gear device 1B is configured so that a high-speed rotor (first member) 10, a low-speed rotor (second member) 20, and a stator (third member) 30 are rotatable relative to one another around a rotation axis R. In the magnetic wave gear device 1B, the high-speed rotor 10, the low-speed rotor 20, and the stator 30 are disposed in this order from inside in the radial direction. The structures of the low-speed rotor 20 and of the stator 30 are the same as those in the first embodiment.

The high-speed rotor 10 includes a core 11 formed of a magnetic material, and a plurality of permanent magnets (first permanent magnets) 12A. The structure of the high-speed rotor 10 differs from that in the first embodiment in that the high-speed rotor 10 includes no permanent magnet 12B. The plurality of permanent magnets 12A face the low-speed rotor 20 and are disposed at regular intervals around the rotation axis R. The magnetic poles of sides of the plurality of permanent magnets 12A close to the low-speed rotor 20 are the same pole (the north pole or the south pole). The core 11 is formed in a columnar shape. The core 11 includes a plurality of exposed core parts 11a (second magnetic material pieces), an exposed core part 11a being disposed between permanent magnets 12A next to each other, and the exposed core parts 11a facing an air-gap between the high-speed rotor 10 and the low-speed rotor 20. The exposed core parts 11a are configured integrally with the core 11, and are formed of a magnetic material. Since the exposed core parts 11a are magnetized by an external magnetic field, the number of the exposed core parts 11a is counted in the pole pair number of the high-speed rotor 10. That is, in this embodiment, the number of sets of the permanent magnet 12A and the exposed core part 11a is the pole pair number $N_h$ of the high-speed rotor 10.

Thus, in this embodiment, the pole pair number $N_h$ of the high-speed rotor 10 is 5, the magnetic pole number $N_l$ of the low-speed rotor 20 is 17, and the pole pair number $N_s$ of the stator 30 is 12. Therefore, the above equation (1) is satisfied.

The permanent magnets disposed in the high-speed rotor 10 need not be the permanent magnets 12A but may be the permanent magnets 12B as long as the magnetic poles of sides of the permanent magnets facing the air-gap with respect to the low-speed rotor 20 are the same.

Consequently, in the second embodiment, the following configuration is adopted. The magnetic wave gear device 1B includes: the high-speed rotor 10, the low-speed rotor 20, and the stator 30 which are rotatable relative to one another around the rotation axis R. The low-speed rotor 20 is disposed between the high-speed rotor 10 and the stator 30, and includes the plurality of magnetic material pieces 21 disposed around the rotation axis R. The high-speed rotor 10 includes the plurality of permanent magnets 12A facing the low-speed rotor 20 and disposed around the rotation axis R, and the magnetic poles of sides of the permanent magnets 12A facing the low-speed rotor 20 are the same pole. The stator 30 includes: the plurality of pole teeth 32 facing the low-speed rotor 20 and disposed around the rotation axis R, the pole tooth 32 being wound with the coil 33; and the plurality of permanent magnets 34B, each permanent magnet 34B being disposed between pole teeth 32 next to each other, and the magnetic poles of sides of the permanent magnets 34B facing the low-speed rotor 20 being the same pole. According to this configuration, the amount of disposed permanent magnets can be decreased into about ½ of that of the double-sided magnet type shown in FIG. 3A described later. Hereinafter, the magnetic wave gear device 1B may be referred to as a "½-PM type".

Figure 3A:
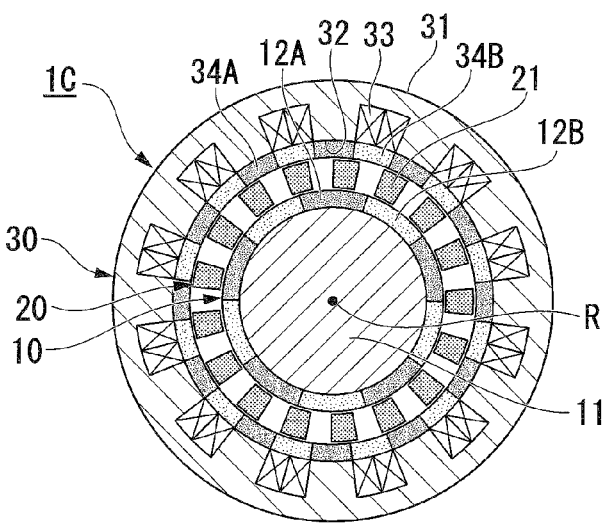
FIG. 3A is a cross-sectional configuration diagram showing a magnetic wave gear device of a comparative example.
Figure 3B:
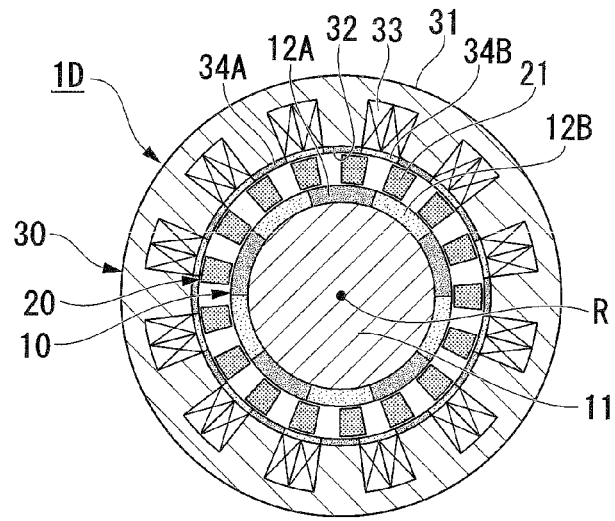
FIG. 3B is a cross-sectional configuration diagram showing a magnetic wave gear device of a comparative example.
Figure 3C:
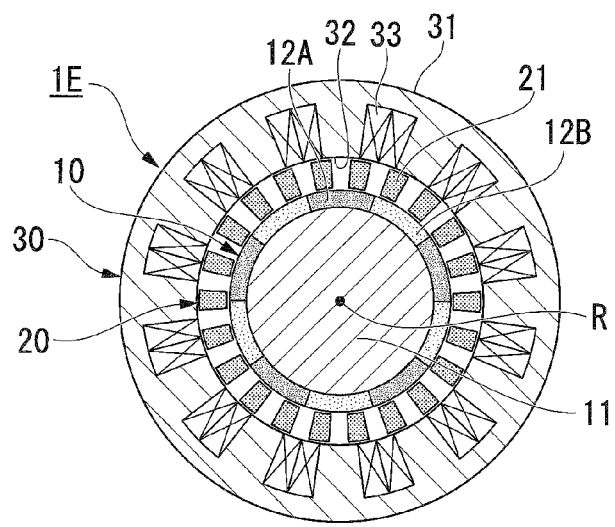
FIG. 3C is a cross-sectional configuration diagram showing a magnetic wave gear device of a comparative example.

Next, effects of the present invention (the ¾-PM type (a practical example 1) and the ½-PM type (a practical example 2)) are described in detail by comparison with comparative examples 1 to 3 shown in FIGS. 3A to 3C.

FIG. 3A is a cross-sectional configuration diagram showing a magnetic wave gear device 1C of a comparative example. FIG. 3B is a cross-sectional configuration diagram showing a magnetic wave gear device 1D of another comparative example. FIG. 3C is a cross-sectional configuration diagram showing a magnetic wave gear device 1E of further another comparative example. In the following description, a component, which is the same as or is similar to the first and second embodiments, is represented by the same reference sign as the first and second embodiments, and the description of the component is simplified or is omitted.

The comparative example 1 shown in FIG. 3A relates to the magnetic wave gear device 1C of a double-sided magnet type. As shown in FIG. 3A, the double-sided magnet type differs from the ¾-PM type in that permanent magnets 34A are also disposed on the tops of the pole teeth 32 of the stator 30. That is, the permanent magnets 34A are disposed between the pole teeth 32 and the low-speed rotor 20 in the radial direction.

The comparative example 2 shown in FIG. 3B relates to the magnetic wave gear device 1D of an improved double-sided magnet type. As shown in FIG. 3B, the improved double-sided magnet type differs from the double-sided magnet type (the magnetic wave gear device 1C) in that the thickness of the permanent magnets 34A and 34B disposed in the stator 30 is decreased and thus the amount of disposed permanent magnets is reduced.

The comparative example 3 shown in FIG. 3C relates to the magnetic wave gear device 1E of a single-sided magnet type. As shown in FIG. 3C, the one side-magnet type differs from the ¾-PM type in that no permanent magnet is disposed in the stator 30.

Graphs, in which the performances of the practical examples 1 and 2 and the comparative examples 1 to 3 are compared to each other under the following conditions by using a two-dimensional finite element analysis, are shown in FIGS. 4 to 7.

(Conditions of Two-Dimensional Finite Element Analysis)
pole pair number of a high-speed rotor: 5
number of stator slots: 12
size (stator size): φ80×30 (mm)
coil: 10 turns, 2Y connection
permanent magnet: Br=1.25 (T)

Figure 4:
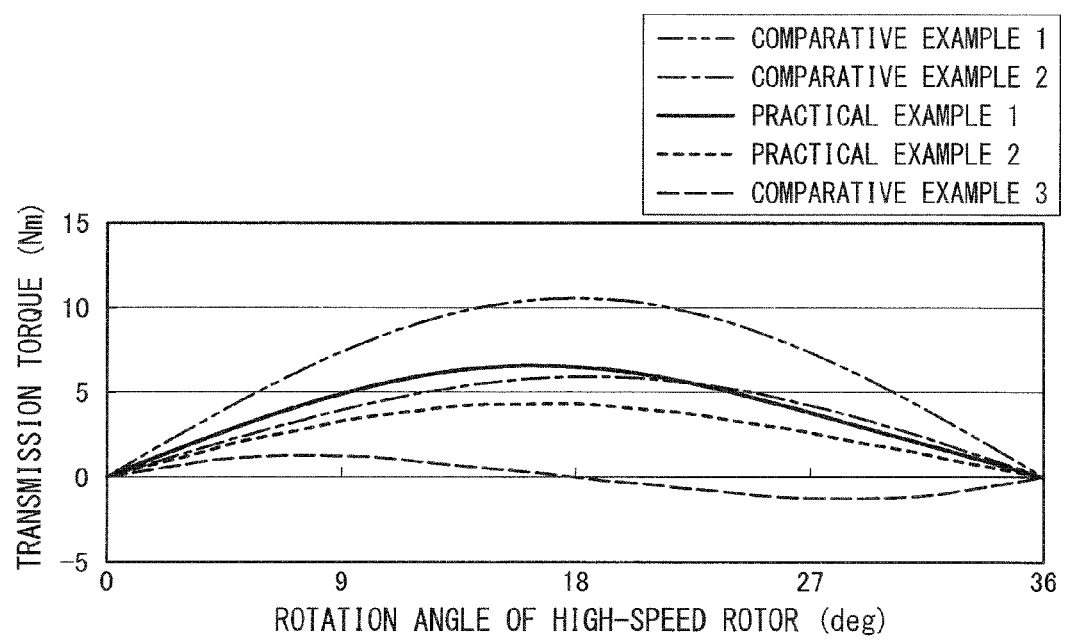
FIG. 4 is a graph showing relationships between transmission torque and rotation angle of a high-speed rotor in practical examples 1 and 2 and comparative examples 1 to 3.
Figure 5:
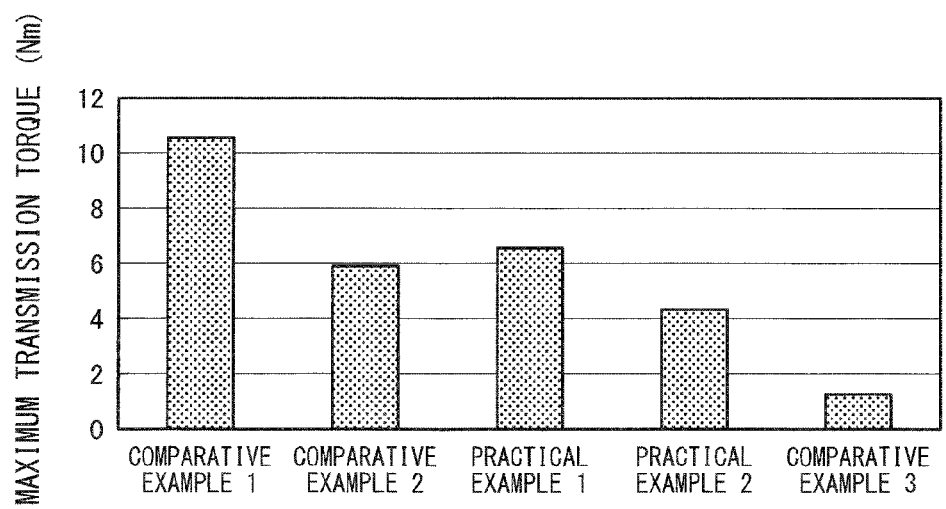
FIG. 5 is a graph showing a relationship of maximum transmission torque between the practical examples 1 and 2 and the comparative examples 1 to 3.
Figure 6:
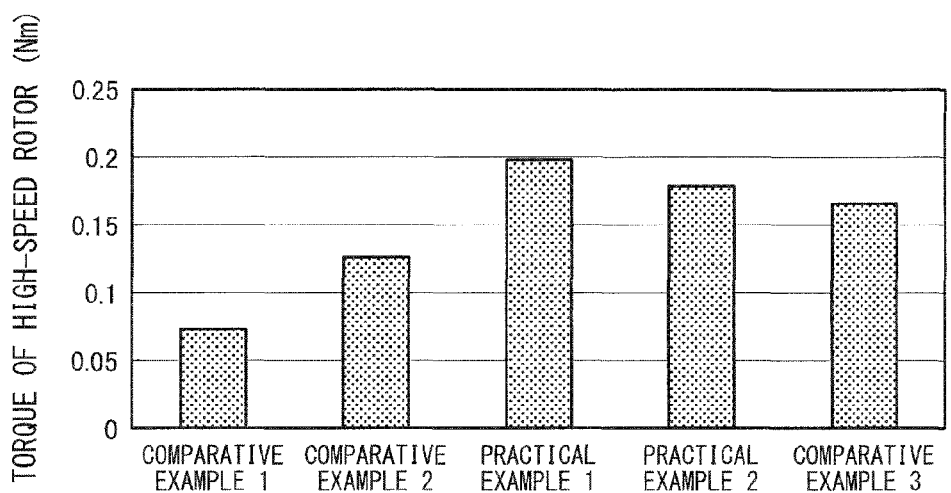
FIG. 6 is a graph showing a relationship of torque of the high-speed rotor between the practical examples 1 and 2 and the comparative examples 1 to 3.
Figure 7:
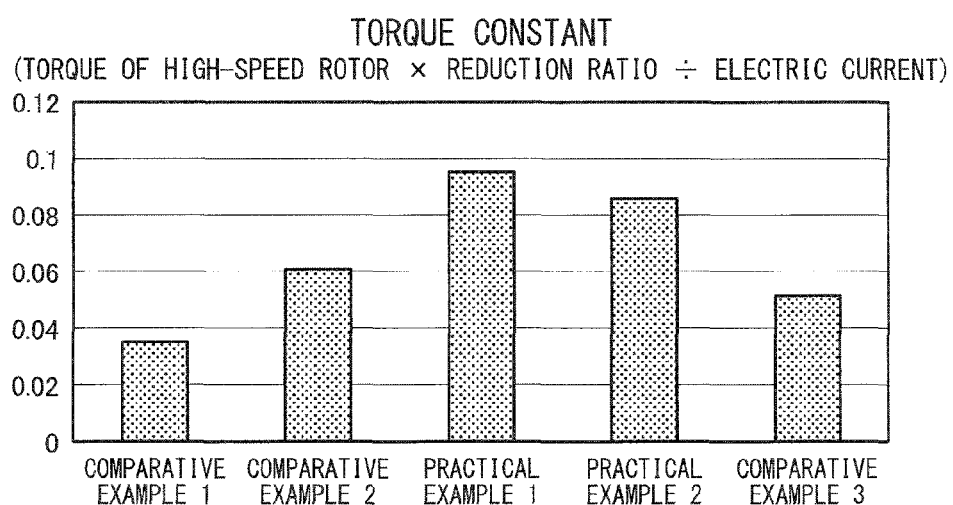
FIG. 7 is a graph showing a relationship of torque constant between the practical examples 1 and 2 and the comparative examples 1 to 3.

FIG. 4 is a graph showing relationships between transmission torque and rotation angle of a high-speed rotor 10 in the practical examples 1 and 2 and the comparative examples 1 to 3. FIG. 5 is a graph showing a relationship of maximum transmission torque between the practical examples 1 and 2 and the comparative examples 1 to 3. FIG. 6 is a graph showing a relationship of torque of the high-speed rotor 10 between the practical examples 1 and 2 and the comparative examples 1 to 3. FIG. 7 is a graph showing a relationship of torque constant between the practical examples 1 and 2 and the comparative examples 1 to 3.

The speed reduction ratio of the single-sided magnet type (the comparative example 3) is set to 2.2 in relation to the analytical model, and as shown in FIG. 4, the torque waveform of the single-sided magnet type differs from those of the other types (the speed reduction ratio: 3.4).

In FIGS. 5 to 7, the practical examples 1 and 2 and the comparative examples 1 to 3 are arranged from left in descending order of the amount of disposed permanent magnets.

FIG. 5 shows that the maximum transmission torque has the relationship of the comparative example 1>the practical example 1>the comparative example 2>the practical example 2>the comparative example 3.

FIG. 6 shows that the torque (the power generation torque or the energizing torque) of the high-speed rotor 10 has the relationship of the practical example 1>the practical example 2>the comparative example 3>the comparative example 2>the comparative example 1.

FIG. 7 shows that the torque constant has the relationship of the practical example 1>the practical example 2>the comparative example 2>the comparative example 3>the comparative example 1. The torque constant is a value showing a conversion rate from electric power (electric current) to torque, and is calculated using a formula: torque of the high-speed rotor 10×speed reduction ratio÷electric current.

The productivities and performances of the practical examples 1 and 2 and the comparative examples 1 to 3 are simply arranged and shown in the following table 1.

TABLE 1

| | COMPARATIVE EXAMPLE 1 | COMPARATIVE EXAMPLE 2 | PRACTICAL EXAMPLE 1 | PRACTICAL EXAMPLE 2 | COMPARATIVE EXAMPLE 3 |
|---|---|---|---|---|---|
| ENERGIZING TORQUE | X | Δ | ○ | ○ | Δ |
| PRODUCTIVITY | X | X | Δ | Δ | ○ |
| MAXIMUM TRANSMISSION TORQUE | ○ | Δ | Δ | Δ | X |
| NUMBER OF DISPOSED PERMANENT MAGNETS | X | X | Δ | ○ | ○ |

As shown in the table 1, in the double-sided magnet type (the comparative example 1), since the amount of disposed permanent magnets is large, the double-sided magnet type has an advantage that the maximum transmission torque is high. However, the permanent magnets 34A and 34B provided in the stator 30 become gaps, and thus the energizing torque is decreased. Furthermore, the amount of disposed permanent magnets is large, and therefore it is shown that the productivity is low.

In the improved double-sided magnet type (the comparative example 2), the energizing torque is slightly improved by trade-off between the maximum transmission torque and the energizing torque. However, the amount of disposed permanent magnets is large, and therefore it is shown that the productivity is low.

In the single-sided magnet type (the comparative example 3), the productivity is excellent, and the energizing torque is high. However, since the amount of disposed permanent magnets is small and thus the amount of magnetic flux passing through a magnetic circuit is small, it is shown that the maximum transmission torque is low.

On the other hand, in the ¾-PM type (the practical example 1), the maximum transmission torque is excellent although this torque is less than that of the double-sided magnet type (the comparative example 1), and the energizing torque is quite excellent. Therefore, it is shown that the ¾-PM type is excellent particularly in application to the direct drive. Additionally, in the ¾-PM type, the amount of disposed permanent magnets is less than that of the double-sided magnet type, and therefore it is shown that the productivity is high.

In the ½-PM type (the practical example 2), although the performance is slightly inferior to the ¾-PM type, the amount of disposed permanent magnets is further small, and therefore it is shown that the productivity is further high.

As a result, according to the ¾-PM type or to the ½-PM type of the present invention, the productivity and the performance can be balanced by disposing an appropriate number of permanent magnets in appropriate locations without using a large amount of permanent magnets unlike the double-sided magnet type, and it is shown that the ¾-PM type and the ½-PM type are excellent particularly in application to the direct drive. For example, if a system of a permanent magnet-type electric motor (or a power generator) and a mechanical speed reducer (or a mechanical speed increaser) in the related art is replaced with the ¾-PM type or with the ½-PM type of the present invention, it is possible to realize reduction in size and in weight. In addition, since the ¾-PM type and the ½-PM type have a characteristic that two rotors slip on each other at the time of overload, it is possible to protect a motor circuit and the like from overcurrent without using a control circuit.

Hereinbefore, the preferable embodiments of the present invention are described with reference to the drawings. However, the present invention is not limited to the above embodiments and is limited only by the scopes of the attached claims. The shape, the combination or the like of each component shown in the above embodiments is an example, and additions, omissions, replacements, and other modifications of configurations based on design requests or the like can be adopted within the scope of and not departing from the gist of the present invention.

Figure 8:
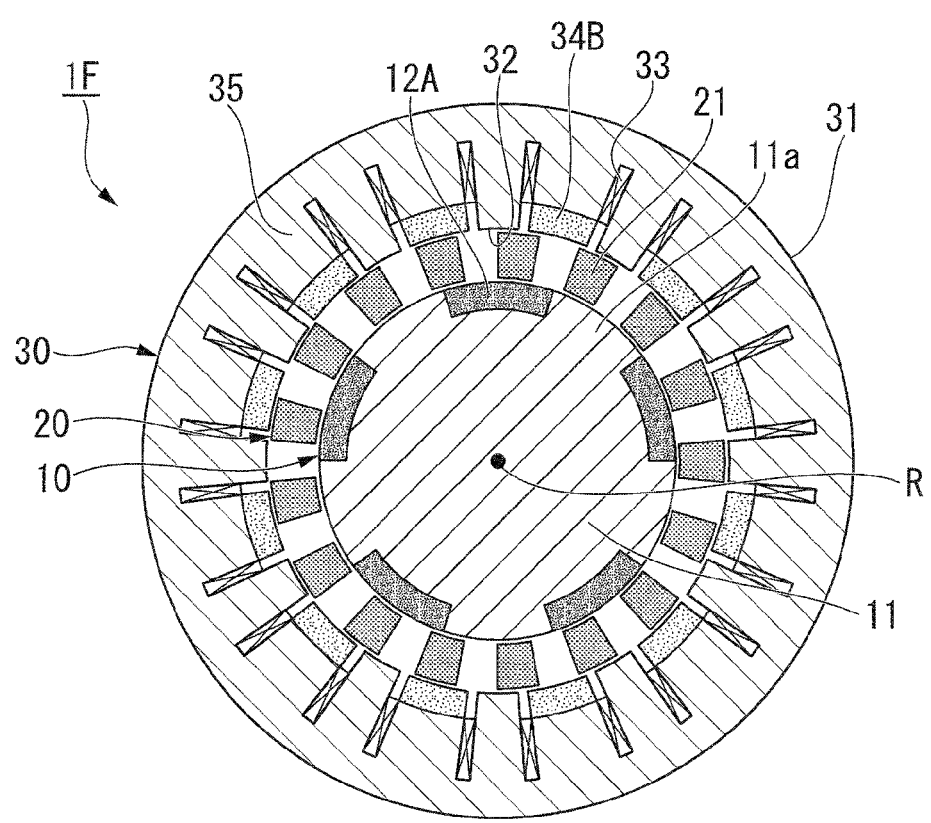
FIG. 8 is a cross-sectional configuration diagram showing a magnetic wave gear device of a third embodiment of the present invention.

For example, the present invention is also made in a stator structure shown in FIG. 8.

FIG. 8 is a cross-sectional configuration diagram showing a magnetic wave gear device 1F of a third embodiment of the present invention. In FIG. 8, a component, which is the same as or is similar to the first and second embodiments, is represented by the same reference sign as the first and second embodiments, and the description of the component is simplified or is omitted.

The magnetic wave gear device 1F shown in FIG. 8 is configured such that the permanent magnets 34B provided in the stator 30 are not disposed at the openings of the slots inside which the coils 33 wound on the pole teeth 32 are disposed, but are disposed on core parts of the stator 30 on which the coils 33 are not wound.

In more detail, the stator 30 in this embodiment further includes a pole tooth intermediate portion 35 disposed between coils 33 wound on pole teeth 32 next to each other. The pole tooth intermediate portions 35 are formed integrally with the yoke 31 of the stator 30. The permanent magnets 34B are provided on the tops of the pole tooth intermediate portions 35. That is, the permanent magnets 34B are disposed between the pole tooth intermediate portions 35 and the low-speed rotor 20 in the radial direction. In this embodiment, although each permanent magnet 34B is also disposed between pole teeth 32 next to each other, a gap is formed between the permanent magnet 34B and the pole tooth 32. The gap is approximately the same as the width of a slot, inside which the coil 33 is disposed, in the circumferential direction of the stator 30. However, the permanent magnet 34B may contact the pole tooth 32.

In the above embodiments, the second member is set to be the rotatable low-speed rotor. However, for example, as disclosed in Patent Document 1, the second member may be fixed, and the third member may be configured to be rotatable.

In the above embodiments, the high-speed rotor (first member) is disposed on an inner side in the radial direction of the gear device, the stator (third member) is disposed on an outer side in the radial direction of the gear device, and the low-speed rotor (second member) is disposed between the high-speed rotor and the stator. However, the high-speed rotor (first member) may be disposed on an outer side in the radial direction of the gear device, and the stator (third member) is disposed on an inner side in the radial direction of the gear device.

For example, in the above embodiments, a configuration in which a magnetic wave gear device of the present invention is applied to a motor (electric motor) is shown. However, a magnetic wave gear device of the present invention can also be applied to an electric power generator. In addition, a magnetic wave gear device of the present invention can be suitably applied to a large-size wind power generator as an example of the power generator.

INDUSTRIAL APPLICABILITY

The present invention can be applied to a magnetic wave gear device usable for the direct drive.

DESCRIPTION OF REFERENCE SIGNS 1A, 1B, 1F magnetic wave gear device
10 high-speed rotor (first member)
11a exposed core part (second magnetic material piece)
12A, 12B permanent magnet (first permanent magnet)
20 low-speed rotor (second member
21 magnetic material piece
30 stator (third member)
32 pole tooth
33 coil
34B permanent magnet (second permanent magnet)
35 pole tooth intermediate portion
R rotation axis

The invention claimed is:

1. A magnetic wave gear device comprising:
a first member, a second member, and a third member which are rotatable relative to one another around a rotation axis,
wherein the second member is disposed between the first and third members, and includes a plurality of magnetic material pieces disposed around the rotation axis,
wherein the first member includes a plurality of first permanent magnets facing the second member and disposed around the rotation axis, and
wherein the third member includes:
  (i) a plurality of pole teeth facing the second member and disposed around the rotation axis, a coil being singly wound on each pole tooth, and portions of coils next to each other in a direction around the rotation axis being disposed between pole teeth next to each other in the direction, and
  (ii) a plurality of second permanent magnets, each second permanent magnet being disposed between the pole teeth in the direction and being disposed between the second member and the portions of the coils in a radial direction, and magnetic poles of sides of the second permanent magnets facing the second member being the same pole.

2. The magnetic wave gear device according to claim 1, wherein the plurality of first permanent magnets are disposed such that magnetic poles of first permanent magnets next to each other are opposite to each other in the radial direction.

3. The magnetic wave gear device according to claim 1, wherein the plurality of first permanent magnets are disposed such that magnetic poles of sides of the first permanent magnets facing the second member are the same pole.

4. The magnetic wave gear device according to claim 3, wherein a second magnetic material piece is disposed between first permanent magnets next to each other.

5. The magnetic wave gear device according to claim 1, wherein the third member further includes a pole tooth intermediate portion disposed between coils wound on pole teeth next to each other, and
the second permanent magnet is disposed between the pole tooth intermediate portion and the second member in the radial direction.

6. The magnetic wave gear device according to claim 1, wherein the second permanent magnet is provided so as to contact the pole tooth.

7. The magnetic wave gear device according to claim 1, wherein a gap is formed between the second permanent magnet and the pole tooth.

* * * * *